United States Patent
Caballero et al.

(10) Patent No.: US 8,818,450 B2
(45) Date of Patent: Aug. 26, 2014

(54) ELECTRONIC DEVICE WITH PROXIMITY-BASED RADIO POWER CONTROL

(71) Applicant: Apple Inc., Cupertino, CA (US)

(72) Inventors: Ruben Caballero, San Jose, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/777,955

(22) Filed: Feb. 26, 2013

(65) Prior Publication Data

US 2013/0172045 A1    Jul. 4, 2013

Related U.S. Application Data

(63) Continuation of application No. 12/207,326, filed on Sep. 9, 2008, now Pat. No. 8,417,296.

(60) Provisional application No. 61/059,247, filed on Jun. 5, 2008.

(51) Int. Cl.
*H04W 52/24* (2009.01)

(52) U.S. Cl.
USPC ........ 455/552.1; 455/522; 455/566; 455/550; 455/550.1; 455/13.4

(58) Field of Classification Search
CPC ............... H04B 1/3838; H04B 2001/0416; Y02B 60/50; Y02B 60/1289; H04W 52/246; H04W 52/283; H04W 52/52
See application file for complete search history.

(56) References Cited

U.S. PATENT DOCUMENTS

| | | | | |
|---|---|---|---|---|
| 5,337,353 | A * | 8/1994 | Boie et al. | 379/433.01 |
| 5,650,597 | A * | 7/1997 | Redmayne | 178/18.06 |
| 6,408,193 | B1 * | 6/2002 | Katagishi et al. | 455/571 |
| 7,016,686 | B2 * | 3/2006 | Spaling et al. | 455/453 |
| 7,146,139 | B2 * | 12/2006 | Nevermann | 455/115.1 |
| 7,499,722 | B2 * | 3/2009 | McDowell et al. | 455/522 |
| 2003/0064761 | A1 | 4/2003 | Nevermann | |
| 2003/0197597 | A1 * | 10/2003 | Bahl et al. | 340/7.58 |
| 2005/0157646 | A1 * | 7/2005 | Addagatla et al. | 370/232 |
| 2006/0161871 | A1 * | 7/2006 | Hotelling et al. | 715/863 |
| 2008/0220831 | A1 * | 9/2008 | Alameh et al. | 455/575.2 |

FOREIGN PATENT DOCUMENTS

| | | |
|---|---|---|
| CN | 1696743 | 11/2005 |
| CN | 101053170 | 10/2007 |

* cited by examiner

*Primary Examiner* — Yuwen Pan
*Assistant Examiner* — Fanghwa Wang
(74) *Attorney, Agent, or Firm* — Treyz Law Group; G. Victor Treyz; Chih-Yun Wu

(57) ABSTRACT

An electronic device such as a portable electronic device may have an antenna and associated wireless communications circuitry. A sensor such as a proximity sensor may be used to detect when the electronic device is in close proximity to a user's head. Control circuitry within the electronic device may be used to adjust radio-frequency signal transmit power levels. When it is determined that the electronic device is within a given distance from the user's head, the radio-frequency signal transmit power level may be reduced. When it is determined that the electronic device is not within the given distance from the user's head, proximity-based limits on the radio-frequency signal transmit power level may be removed. Data may be gathered from a touch sensor, accelerometer, ambient light sensor and other sources for use in determining how to adjust the transmit power level.

8 Claims, 8 Drawing Sheets

ELECTRONIC DEVICE WITH PROXIMITY-BASED RADIO POWER CONTROL

This application claims the benefit of provisional patent application No. 61/059,247, filed Jun. 5, 2008, and U.S. patent application Ser. No. 12/207,326 filed Sep. 9, 2008, which are hereby incorporated by reference herein in their entirety.

BACKGROUND

This invention relates generally to electronic devices, and more particularly, to power control techniques for radio-frequency circuitry in electronic devices.

Electronic devices such as handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, handheld electronic devices may use long-range wireless communications to communicate with wireless base stations. Cellular telephones and other devices with cellular capabilities may communicate using cellular telephone bands at 850 MHz, 900 MHz, 1800 MHz, and 1900 MHz. Portable electronic devices may also use short-range wireless communications links. For example, portable electronic devices may communicate using the Wi-Fi® (IEEE 802.11) bands at 2.4 GHz and 5.0 GHz and the Bluetooth® band at 2.4 GHz. Data communications are also possible at 2100 MHz.

To satisfy consumer demand for small form factor wireless devices, manufacturers are continually striving to reduce the size of components that are used in these devices while providing enhanced functionality. It is generally impractical to completely shield a user of a compact handheld device from transmitted radio-frequency signals. For example, conventional cellular telephone handsets generally emit signals in the vicinity of a user's head during telephone calls. Government regulations limit radio-frequency signal powers. In particular, so-called specific absorption rate (SAR) standards are in place that impose maximum energy absorption limits on handset manufacturers. At the same time, wireless carriers require that the handsets that are used in their networks be capable of producing certain minimum radio-frequency powers so as to ensure satisfactory operation of the handsets.

The manufacturers of electronic devices such as wireless handheld devices therefore face challenges in producing devices with adequate radio-frequency signal strengths that are compliant with applicable government regulations.

It would therefore be desirable to be able to provide electronic devices with improved wireless capabilities.

SUMMARY

An electronic device such as a handheld electronic device or other portable electronic device may be provided that has wireless communications capabilities. An antenna may be used to transmit and receive radio-frequency signals. The signals may be associated with cellular telephone communications bands.

A proximity sensor may be provided in the device. The proximity sensor may include a light source such as a light-emitting diode and a photodetector. During operation of the device, the light source emits light. If an object such as the head of a user is within a given distance of the electronic device, the emitted light will be reflected back to the electronic device and will be detected by the photodetector. This allows the electronic device to determine whether the electronic device is in close proximity to the user's head.

Information on whether the electronic device is close to the user's head may also be gathered using data from other sources. For example, the electronic device may have a touch screen with a touch sensor or may have other touch sensitive components. Signals from these touch sensors may be used to help determine whether the electronic device is adjacent to the user's head. The electronic device may also have sensors such as an ambient light sensor and an accelerometer. The ambient light sensor may detect when a shadow passes over the front face of the device, which may be indicative of a close distance between the electronic device and an external object. The accelerometer may produce data that is indicative of the current orientation of the electronic device relative to the ground and data that is indicative of whether the device is in motion or at rest. In situations in which the device is being held in an orientation in which one of the edges of the device faces the ground and in which the device is in motion, the electronic device can conclude that the electronic device is in close proximity to the user's head.

The electronic device may have an adjustable radio-frequency power amplifier. The device may adjust the output power from the radio-frequency power amplifier to control the power level of transmitted cellular telephone signals. If it is determined that the electronic device is close to the user's head, the maximum allowable transmit power level may be limited. If it is determined that the electronic device is not in close proximity to the user's head, the radio-frequency transmit power of the device need not be limited.

Further features of the invention, its nature and various advantages will be more apparent from the accompanying drawings and the following detailed description of the preferred embodiments.

DETAILED DESCRIPTION

The present invention relates generally to electronic devices, and more particularly, to managing transmitted radio-frequency power levels in portable electronic devices such as handheld electronic devices.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
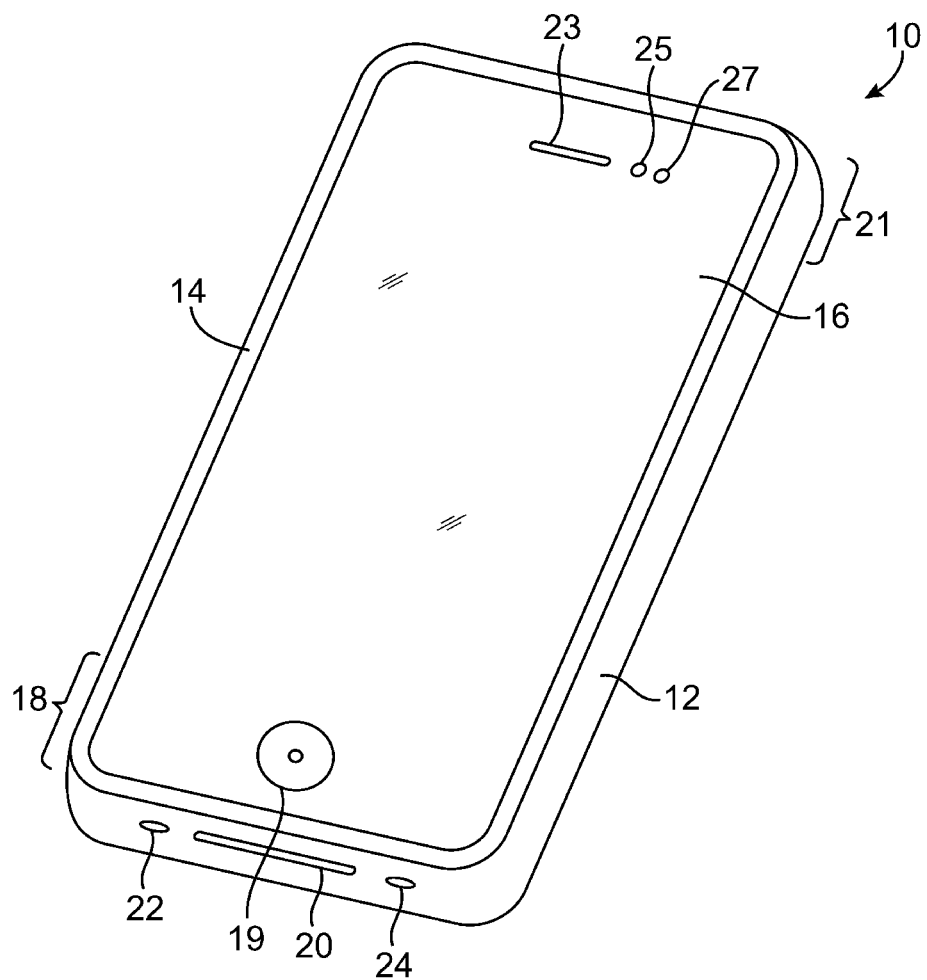
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports 2G and/or 3G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted. Housing 12 or portions of housing 12 may also be formed from conductive materials such as metal. An advantage of forming housing 12 from a dielectric material such as plastic is that this may help to reduce the overall weight of device 10.

In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10. Housing 12 may have a bezel such as bezel 14 that surrounds display 16. Bezel 14 may be formed from a conductive material or other suitable material and may be used as part of the antennas in device 10. For example, bezel 14 may be shorted to printed circuit board conductors or other internal ground plane structures in device 10 to form part of an antenna ground plane.

Display 16 may be a liquid crystal display (LCD), an organic light-emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter. Touch screen displays such as display 16 may be formed from capacitive touch sensors or any other suitable touch sensors (e.g., resistive touch sensors, touch sensors based on light or sound waves, etc.). An advantage of capacitive touch sensors is that they may be used to sense the presence of an object even when the object is not in direct contact with display 16.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Device 10 may contain sensors that provide information about the environment and condition of device 10. For example, device 10 may contain a proximity sensor such as sensor 25 and an ambient light sensor such as ambient light sensor 27.

Proximity sensor 25 may include, for example, a light-emitting diode (LED) and an associated photodetector such as a photodiode. The light-emitting diode may be an infrared light-emitting diode (as an example). Reflected light from nearby objects may be detected using the photodiode. When sufficient reflected light is detected, it can be concluded that a human body part (e.g., a head, finger, or hand) or other object is located close to sensor 25. When insufficient reflected light is detected, it can be concluded that no objects are located near to sensor 25. If desired, emitted light from sensor 25 may be concentrated at a particular distance from sensor 25 using a lens or other focusing structure. This may help to enhance the strength of reflected signals from objects located at this particular distance (e.g., objects located at 0.5 to 10 cm away from the planar front surface of display 16).

The light-emitting diode in the proximity sensor may be modulated at a particular frequency or may be modulated using any other suitable modulation pattern. The use of a modulation pattern to drive the light-emitting diode may help to discriminate reflected light-emitting diode signals from background illumination. This may increase the signal-to-noise ratio of the proximity sensor. If desired, proximity sensor 25 may be based on proximity detection arrangements other than light-emitting diode arrangements. For example, a proximity sensor for device 10 may be based on a capacitive sensor, a photodetector that works only with ambient light (and not emitted light from device 10), an acoustic proximity sensor (e.g., a sensor that uses ultrasonic sound waves to determine the presence or absence of a nearby object), a sensor that detects reflected electromagnetic radiation (e.g., radio-frequency radiation), or any other suitable sensor capable of detecting the presence of a nearby object.

Ambient light sensor 27 may be used to detect the level of ambient illumination around device 10. Ambient light sensor 27 may be implemented using a photodiode that is sensitive to visible light. Separate photodiodes are typically used for proximity sensor 25 and ambient light sensor 27, but the photodiode functionality of ambient light sensor 27 and the photodiode functionality of proximity sensor 25 (in a light-based proximity detector) may be implemented using a common photodiode if desired. Information on the amount of light that is gathered by ambient light sensor 27 may be used to adjust the screen brightness of display 16 (as an example).

If desired, proximity sensor functionality may be implemented in device 10 using a device that serves multiple functions. As an example, a capacitive touch sensor or other such touch sensor that is part of a touch display 16 may be used in detecting the presence of a nearby object. During normal operation, touch sensor output signals may be used to identify user input selections as a user presses a finger against various portions of screen 16. When used as a proximity sensor, the output signals of the touch screen may be processed to determine whether or not an object is adjacent to device 10. With this type of arrangement, the capacitive readings obtained from the touch sensor portion of display 16 may be processed, for example, to determine whether a user has placed device 10 next to the user's head. Because the presence of the user's head in the vicinity of screen 16 will change the capacitive reading (or other such touch sensor reading) from the display, the presence of the user's head can be detected without using a conventional proximity sensor. As another example, light readings from an ambient light sensor may be used as an indicator of the proximity of an object to device 10 (e.g., by detecting shadows that indicate the presence of an object). Touch pads without displays may also be used to produce proximity data.

To improve accuracy, signals from multiple proximity sensor devices (e.g., an LED-based proximity sensor, an ambient light sensor used to detect proximity, a capacitive touch screen, etc.) may be processed in parallel. With this type of arrangement, device 10 can more accurately determine whether or not device 10 has been placed in close proximity to an object.

The locations for proximity sensor 25 and ambient light sensor 27 of FIG. 1 are merely illustrative. Sensors such as these may be placed at any suitable location on device 10. When a location such as the location shown in FIG. 1 is used, sensors 25 and 27 obtain information on whether the upper end of device 10 has been placed adjacent to a user's ear and head. This type of configuration arises when a user is using device 10 for a cellular telephone call. When using device 10 to make a telephone call, receiver 23 is placed immediately adjacent to the user's ear, whereas microphone port 24 is placed close to the user's mouth. If desired, sensors such as proximity sensor 25 and/or ambient light sensor 25 may be located at the lower (microphone) end of device 10. For example, proximity sensor 25 may be placed adjacent to menu button 19 to help sense when microphone 24 is adjacent to the user's face.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 and region 21. These are merely illustrative examples. Any suitable portion of device 10 may be used to house antenna structures for device 10 if desired.

Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

In arrangements in which antennas are needed to support communications at more than one band, the antennas may have shapes that support multi-band operations. For example, an antenna may have a resonating element with arms of various different lengths and/or a ground plane with slots of various different sizes that resonate in desired radio-frequency bands. Inverted-F antenna elements, planar inverted-F antenna elements or other antenna structures may be used in the presence of an antenna slot to form a hybrid slot/non-slot antenna.

Antennas (e.g., hybrid slot/non-slot antennas or other suitable antennas) may be used at one end or both ends of device 10. For example, one such antenna may be used as a dual band antenna (e.g., in region 21) and one such antenna may be used as a pentaband antenna (e.g., in region 18).

When an antenna in region 18 is used as a cellular telephone antenna (e.g., for 2G and/or 3G voice and data communications), the antenna will be located at the same end of device 10 as microphone port 24. When device 10 is being held close to the user's head and microphone 24 is being used to conduct a telephone call, the antenna in region 18 will be near to the user's head and will therefore be likely to emit radio-frequency signals near the user's head. Proximity detector 25 and other sensors may be used in detecting the presence of the user's head or other nearby object. To ensure that regulatory limits on radio-frequency emissions in the vicinity of the user's head are satisfied, device 10 may reduce the maximum allowable transmitted radio-frequency signal power that is handled by the antenna in region 18 whenever it is determined that device 10 is in the vicinity of the user's head (i.e., whenever proximity detector 25 and/or other sensors determine that an object is within a few centimeters or other suitable distance from the front face of device 10).

Figure 2:
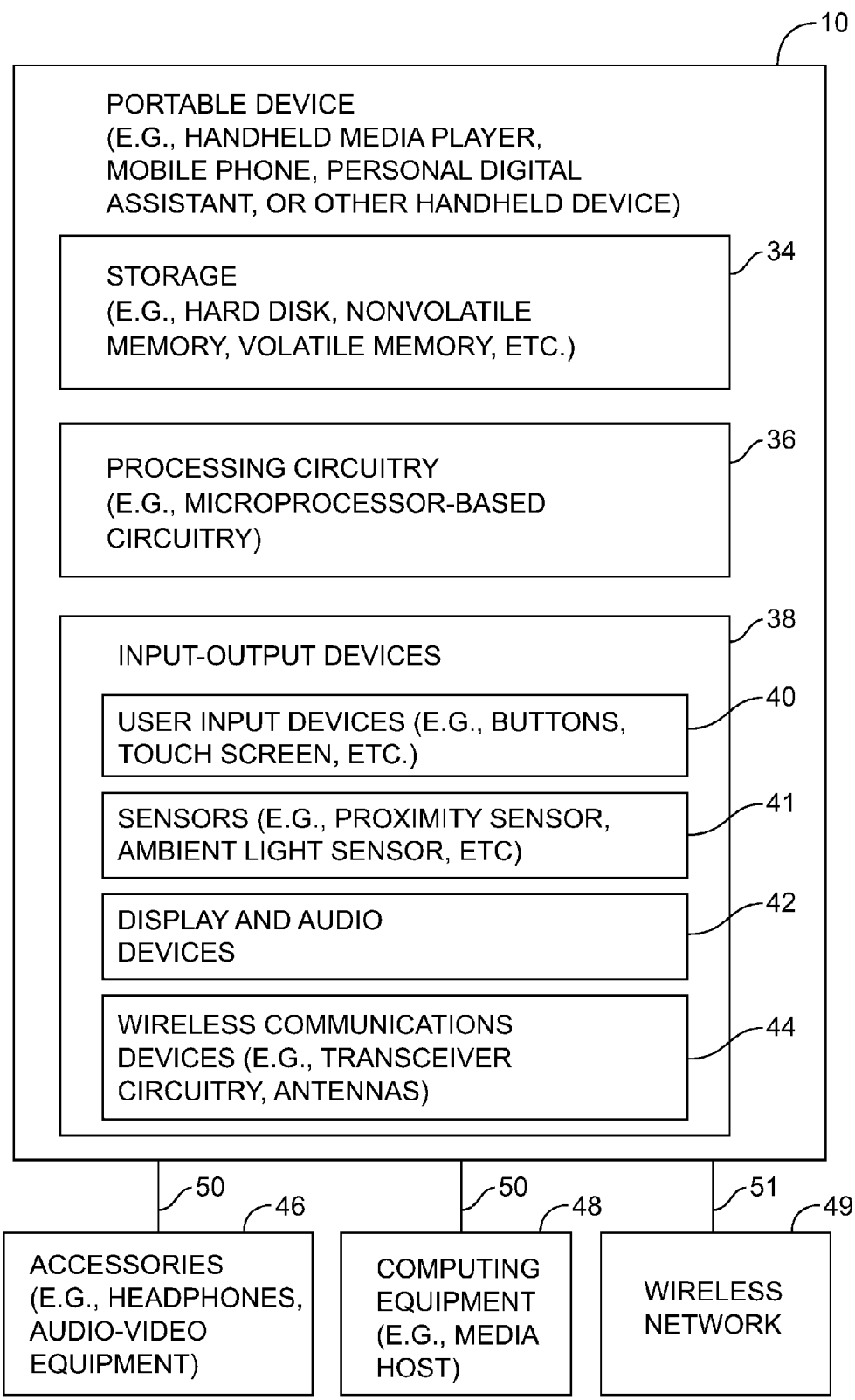
FIG. 2 is a schematic diagram of an illustrative portable electronic device in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3 G communications services (e.g., using wide band code division multiple access techniques), 2G cellular telephone communications protocols, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 may include sensors 41. Sensors 41 may include proximity sensors such as proximity sensor 25 of FIG. 1, ambient light sensors such as ambient light sensor 27, accelerometers (e.g., to determine the orientation of device 10 in real time), sensors formed by utilizing the capabilities of devices such as touch screen 16 or other multipurpose components in device 10, acoustic sensors, electromagnetic sensors, or any other suitable sensors.

Input-output devices 38 can also include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49 as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc. For example, wireless network 49 may include network management equipment that monitors the wireless signal strength of the wireless handsets (cellular telephones, handheld computing devices, etc.) that are in communication with network 49.

To improve the overall performance of the network and to ensure that interference between handsets is minimized, the network management equipment may send power adjustment commands (sometimes referred to as transmit power control commands) to each handset. The transmit power control settings that are provided to the handsets direct handsets with weak signals to increase their transmit powers, so that their signals will be properly received by the network. At the same time, the transmit power control settings may instruct handsets whose signals are being received clearly at high power to reduce their transmit power control settings. This reduces interference between handsets and allows the network to maximize its use of available wireless bandwidth.

When devices such as device 10 receive transmit power control settings from the network, each device 10 may make suitable transmission power adjustments. For example, a device 10 may adjust the gain of the radio-frequency power amplifier circuitry that is used to amplify the radio-frequency signals that are being transmitted by device 10 to a higher level to increase the power of the transmitted radio-frequency signals or to a lower level to decrease the power of the transmitted radio-frequency signals.

The antenna structures and wireless communications devices of device 10 may support communications over any suitable wireless communications bands. For example, wireless communications devices 44 may be used to cover communications frequency bands such as cellular telephone voice and data bands at 850 MHz, 900 MHz, 1800 MHz, 1900 MHz, and 2100 MHz (as examples). Devices 44 may also be used to handle the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz.

Device 10 can cover these communications bands and/or other suitable communications bands using the antenna structures in wireless communications circuitry 44. As an example, a pentaband cellular telephone antenna may be provided at one end of device 10 (e.g., in region 18) to handle 2G and 3G voice and data signals and a dual band antenna may be provided at another end of device 10 (e.g., in region 21) to handle GPS and 2.4 GHz signals. The pentaband antenna may be used to cover wireless bands at 850 MHz, 900 MHz, 1800 MHz, 1900 MHz, and 2100 MHz (as an example). The dual band antenna may be used to handle 1575 MHz signals for GPS operations and 2.4 GHz signals (for Bluetooth® and IEEE 802.11 operations). These are merely illustrative arrangements. Any suitable antenna structures may be used in device 10 if desired.

Figure 3:
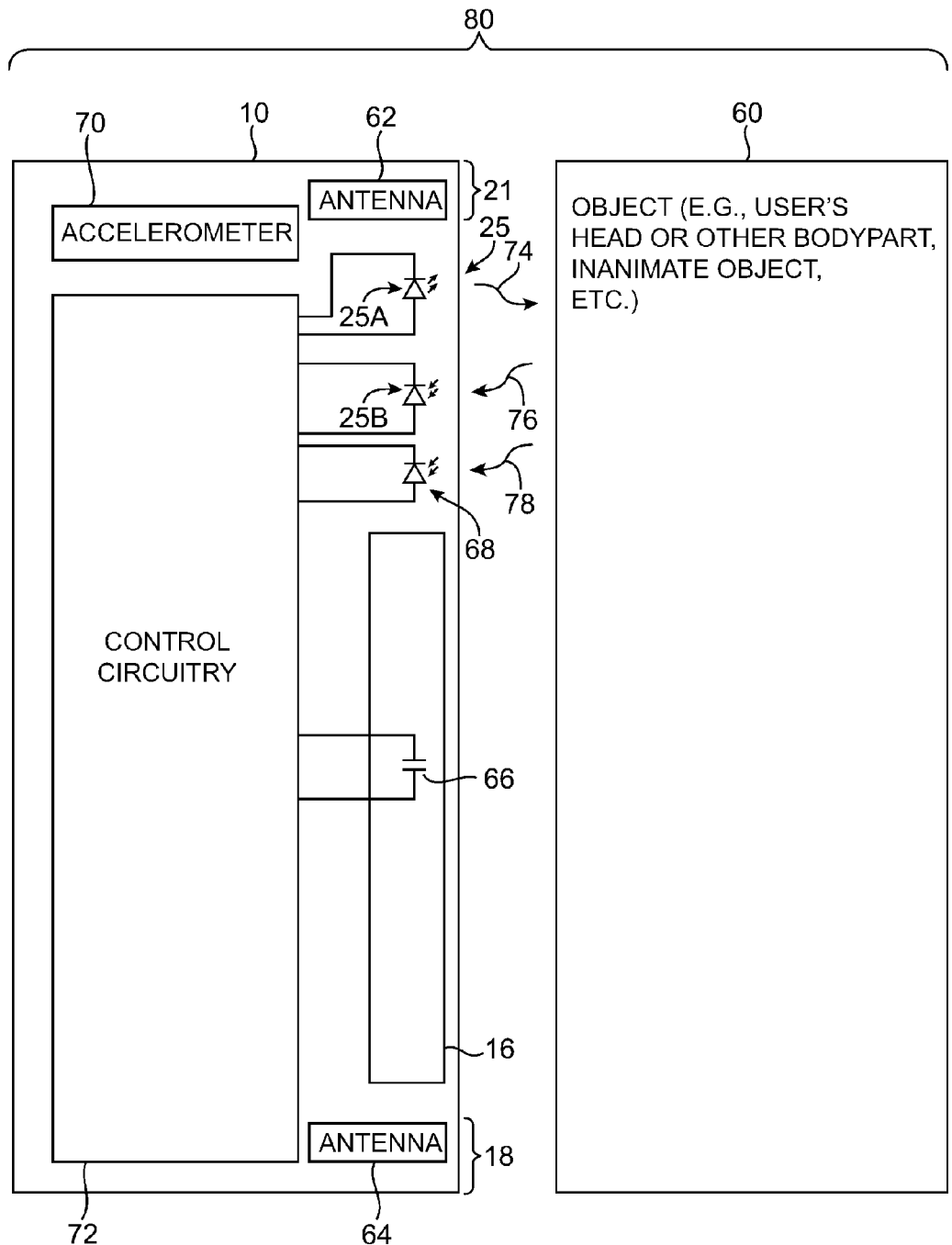
FIG. 3 is a diagram of an illustrative electronic device showing how sensors may be used to detect when the electronic device is in the vicinity of an object such as a human body part in accordance with an embodiment of the present invention.

Regulatory compliance can be ensured by reducing the maximum allowable transmitted radio-frequency signal power from device 10 when device 10 is in the vicinity of a user's head or other body part. As shown in FIG. 3, a typical system environment such as environment 80 includes device 10 and an object such as object 60. Object 60 may be an inanimate object or, more significantly, may be part of the user's body such as a user's head. The energy density associated with radio-frequency emissions from device 10 is generally negligible for IEEE 802.11 and Bluetooth® transmissions (e.g., transmissions that may be associated with antenna 62). The process of receiving and processing GPS signals also generally results in radio-frequency emissions of negligible energy densities.

In contrast, cellular telephone transmissions (e.g., transmissions that may be associated with antenna 64) may have nonnegligible energy densities. This is particularly true for 3G wireless transmissions, which use code-division multiple access (CDMA) coding schemes, rather than the time-division multiplexing (TDM) schemes associated with 2G GSM cellular telephone transmissions. Compliance with regulations that place upper limits on the amount of radio-frequency signal power that may be absorbed by a user's head can be ensured by reducing the power of the radio-frequency signal transmissions associated with antenna 64 (e.g., cellular telephone transmissions) whenever it is determined that device 10 is adjacent to the user's head.

As shown in FIG. 3, device 10 may have control circuitry 72 (e.g., processing circuitry 36, storage 34, and other circuitry from FIG. 2). Control circuitry 72 may process sensor signals to detect object 60.

Sensors that may be used to detect the presence of object 60 in the vicinity of device 10 may include proximity sensor 25. Proximity sensor 25 may include a light-emitting element such as a laser or light-emitting diode. Proximity sensor 25 may also have a light-detecting element. In the example of FIG. 3, proximity sensor 25 has light-emitting diode 25A and a light detecting element such as photodiode 25B. Sensor 25 may use light in any suitable frequency range. For example, sensor 25 may use infrared light. Light 74 that is emitted by diode 25A may be reflected from object 60. Reflected light 76 may be detected by detector (sensor) 25B. If desired, diode 25A may be driven with a modulated signal so that light 74 is modulated. For example, light 74 may be modulated at a particular frequency. Using a bandpass filter centered at the modulation frequency or other suitable filtering arrangement, the signals from sensor 25B may be filtered by control circuitry 72 to subtract background noise (as an example). Techniques such as these may be used to increase the signal-to-noise ratio of the measurement signals produced by proximity detector 25.

Another sensor that may be used in device 10 when detecting the presence of object 60 is ambient light sensor 68. Ambient light sensor 68 may be a photodiode or other light sensor that is capable of detecting incoming light 78. Ambient light sensor 68 may, for example, operate in the visible spectrum and/or in the infrared spectrum. Because more light 78 will generally be received by sensor 68 when sensor 68 is not blocked by the presence of object 60 than when object 60 is present and is casting a shadow on sensor 68, sensor 68 may be used to generate proximity data. This data may be used alone or in conjunction with proximity data from other sensors in assisting device 10 in determining whether or not object 60 is present.

Touch screen 16 may be located on the front face of device 10 (i.e., the side of device 10 that is shown as facing object 60 in the example of FIG. 3). As shown in FIG. 3, Touch sensor 16, may be a capacitive touch sensor having associated capacitances such as capacitance 66. The magnitude of this capacitance (and inputs from the other sensors in FIG. 3) may be monitored by control circuitry 72. When object 60 is present in the vicinity of touch screen 16, the magnitude of capacitance 66 will be affected, which allows control circuitry 72 and device 10 to conclude that object 60 is adjacent to device 10 as shown in FIG. 3.

The detection range of proximity detector 25 and the other sensors in device 10 is typically in the millimeter to centimeter range. Objects closer than the maximum detection distance will be sensed as being in the vicinity of device 10. Objects outside of the detection range will not be considered to be in the vicinity of device 10. If desired, other detection ranges may be used (e.g., detection ranges on the order of tens of centimeters). More typically, however, detection of the presence of object 60 only when object 60 is closer than several centimeters from device 10 is preferred, as this addresses the primary situation in which the energy density of radio-frequency emissions from antenna 64 is of concern.

If desired, sensors such as accelerometer 70 may be used in conjunction with other sensors to help determine when to adjust the power level associated with transmitted radio-frequency signals in device 10. Accelerometer 70 may be used by control circuitry 72 to determine the orientation of device 10 relative to the ground. For example, accelerometer 70 may be used to determine whether device 10 is being held by a user so that one of its left or right edges is facing downwards (as when making a telephone call) or whether device 10 is resting horizontally on a table top. If it is determined that device 10 is horizontal and stationary, it may be concluded that it is impossible or at least unlikely that device 10 is being held in the vicinity of the user's head. This information may be used to help ascertain whether the readings obtained from the other sensors in device 10 are accurate.

During operation of device 10, control circuitry 72 may be aware of the types of radio-frequency signals that are being transmitted. For example, control circuitry 72 might determine that low-power radio-frequency signals are being transmitted over antenna 62 and that antenna 64 is not being used. Control circuitry 72 might also determine when antenna 64 is being used for 2 G communications (and is therefore associated with relatively lower emission levels when averaged over time) and when antenna 64 is being used for 3 G communications (and is therefore associated with relatively larger time-averaged emissions because no time division multiplexing is being used). Control circuitry 72 can use operational information such as this in determining how to adjust the transmitted radio-frequency power from antenna 64, while at the same time making power adjustment decisions based on the readings of one or more sensors (e.g., to determine whether object 60 is in close proximity to device 10). As an example, if it is determined that 2G signals are being transmitted, control circuitry 72 can decide to make no transmit power reductions regardless of the readings of proximity sensor 25, whereas control circuitry 72 can make transmit power reductions when it is determined that 3G signals are being transmitted.

Figure 4:
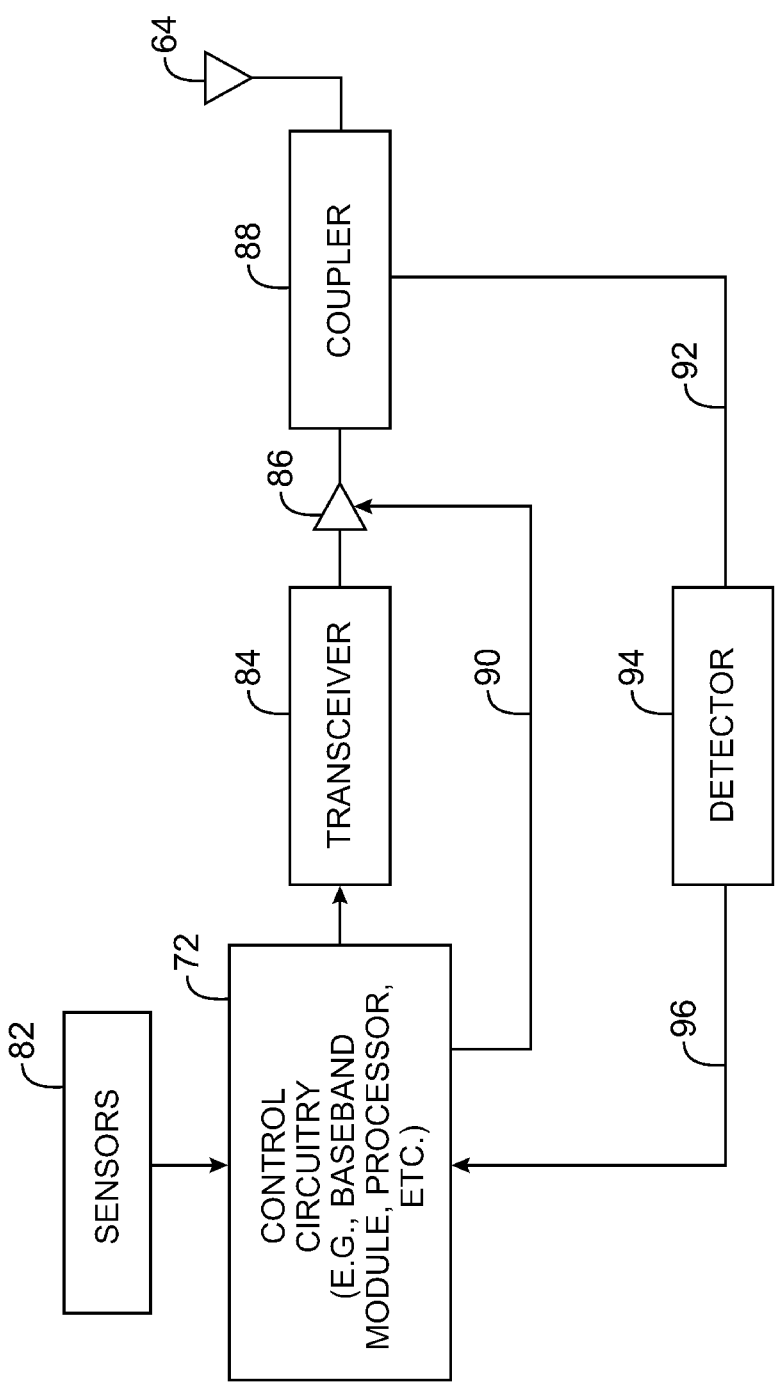
FIG. 4 is a diagram of illustrative circuitry that may be used in an electronic device such as a wireless portable electronic device with output power control capabilities in accordance with an embodiment of the present invention.

An illustrative control arrangement that may be used in controlling transmitted radio-frequency signal powers is shown in FIG. 4. As shown in FIG. 4, control circuitry 72 may include one or more integrated circuits such as a microprocessor (sometimes referred to as an application processor), a baseband module, power management chips, memory, codecs, etc. Transceiver circuitry 84 may be used in producing radio-frequency output signals based on data received from the application processor. Circuitry such as circuitry 84 may, if desired, be integrated into one or more of the integrated circuits in control circuitry 72.

Radio-frequency signals that are to be transmitted by device 10 are generally amplified using radio-frequency amplifier circuitry. The radio-frequency amplifier circuitry may be implemented using one or more gain stages in one or more integrated circuits. In the example of FIG. 4, signals are shown as being amplified by radio-frequency power amplifier 86. If desired, there may be multiple power amplifiers such as amplifier 86 each of which is associated with a different communications band or set of communications bands. A single power amplifier symbol is shown in the schematic diagram of FIG. 4 to avoid over-complicating the drawing.

Power amplifier circuitry 86 may be used to amplify radio-frequency signals prior to transmission over antenna 64. The gain of power amplifier circuitry 86 may be adjusted using a control path such as control path 90. Control path 90 may be used to handle analog and/or digital control signals. The gain of power amplifier 86 may, for example, be controlled by adjusting the magnitude of an analog control voltage or analog power supply voltage. The gain of power amplifier 86 may also be adjusted by turning on and off certain gain stages in power amplifier 86. If desired, digital control signals may be processed by power amplifier 86 and used in controlling the gain setting. Combinations of these approaches or other suitable power amplifier gain adjustments techniques may be used if desired.

The gain of power amplifier 86 may be adjusted to ensure that the strength of the radio-frequency signals that are being transmitted through antenna 64 is sufficient for satisfactory wireless communications, while not exceeding regulatory limits. Either an open loop or closed loop control scheme may be used when controlling the operation of power amplifier 86.

In an open loop scheme, coupler 88 need not be used and the gain of power amplifier 86 may be adjusted by providing control signals to power amplifier 86 over control path 90 without feedback from the output path.

In a closed loop scheme of the type shown in FIG. 4, feedback is obtained from the output path. With one suitable arrangement, a radio-frequency coupler such as coupler 88 is interposed between the output of power amplifier 86 and antenna 64. Coupler 88 may allow most of the power from amplifier 86 to pass to antenna 64. A small fraction (typically less than a few percent) of the output power may be diverted by coupler 88 onto feedback path 92. Radio-frequency detector 94 (e.g., a diode-based power sensor) may be used to sense the power of the diverted radio-frequency signal on path 92. Measured output power data from detector 94 may be provided to control circuitry 72 over path 96. Because the tap ratio of coupler 88 is known, control circuitry 72 can use the radio-frequency output signal power measurement data on path 96 to determine whether the desired output power level from power amplifier 86 is being properly maintained. If adjustments are needed, control circuitry 72 can generate corrective control signals on path 90 in real time. When power amplifier 86 receives these control signals, the gain of power amplifier 86 will be adjusted upwards or downwards as needed.

In configurations in which control circuitry 72 contains more than one processor, each processor may share control duties while controlling the power of transmitted radio-frequency signals. For example, control circuitry 72 may contain a main microprocessor for running an operating system and user applications. Control circuitry 72 may also include one or more smaller more dedicated processors such as a digital signal processor and microprocessor in a baseband module. In environments such as these, each processor may run its own control process. Communications between processors may be implemented using control lines, shared memory, or any other suitable technique.

Figure 5:
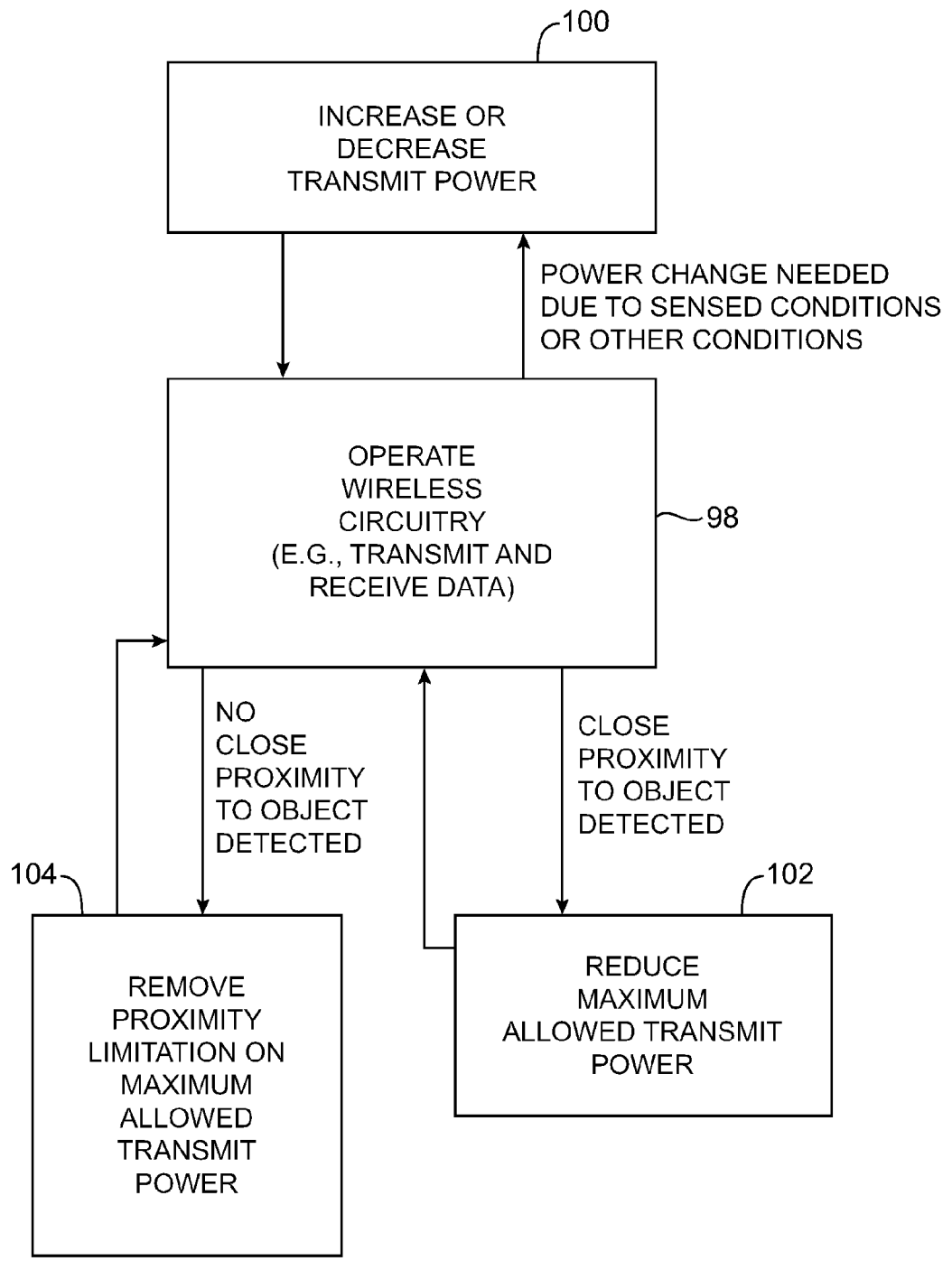
FIG. 5 is a flow chart of illustrative steps involved in controlling transmitted radio-frequency power in a wireless electronic device in accordance with an embodiment of the present invention.

Illustrative steps involved in controlling transmitted radio-frequency signal power levels in device 10 using sensor data and operational data of the type described in connection with FIG. 3 and power control circuitry of the type described in connection with FIG. 4 are shown in FIG. 5. As shown in FIG. 5, device 10 may transmit and receive wireless data during normal operation (step 98). Transmitted wireless data may include local area network data and Bluetooth® data being handled by antenna 62 in region 21 of device 10 and cellular telephone data being handled by antenna 64 in region 18. During operation, control circuitry 72 (FIGS. 3 and 4) may use information from proximity sensor 25 and other sensors in device 10 and may use information on which communications bands are being used and which communications protocols are being used for wireless communications (e.g., from the application processor and/or baseband module) to determine whether transmit power adjustments are warranted. Device 10 may receive transmit power adjustment commands from network 51 (e.g., a cellular base station) that inform device 10 that the transmit power should be adjusted up or down. Device 10 may also determine that real time power adjustments are desirable to compensate for changes in the operating environment for device 10 (e.g., temperature changes). Adjustments to the power of transmitted radio-frequency signals in device 10 in response to transmit power adjustment commands from a cellular base station or other conditions that are not based on the proximity of object 60 to device 10 may be performed during step 100.

When control circuitry 72 determines that object (e.g., the user's head) is in the vicinity of device 10, control circuitry 72 may reduce the maximum allowable transmit power (step 102). Whenever control circuitry 72 determines that object 60 (e.g., the user's head) is no longer in the vicinity of device 10, control circuitry 72 may increase the level of the maximum allowable transmit power (step 104). The current value of the maximum allowable transmit power may represent a power ceiling beyond which the transmit power may not be raised, even if the adjustments of step 100 (e.g., response to a transmit power adjustment command from a cellular base station, response to a temperature-compensation command from an internal control process in device 10, response to a user-selected power adjustment, response to non-proximity-sensor data such as data from an accelerometer, etc.) might otherwise require a larger power.

Figure 6:
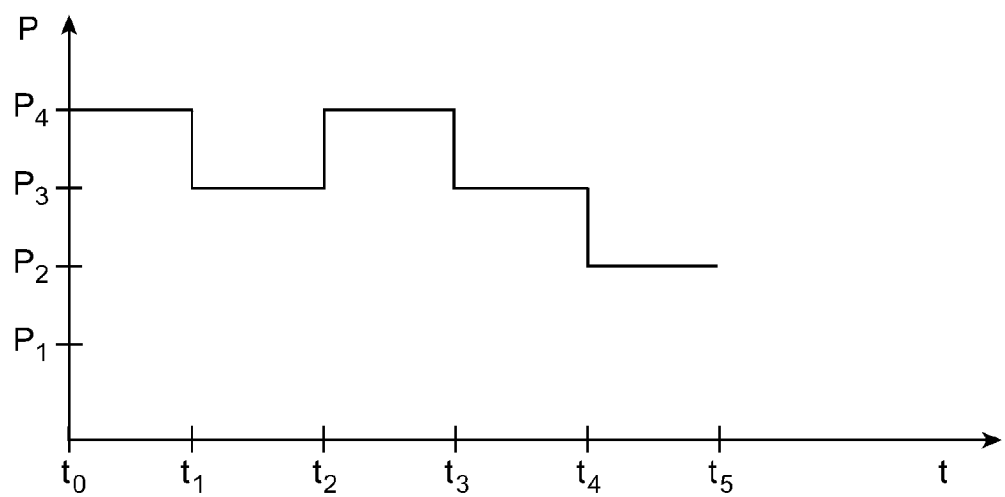
FIG. 6 is a graph showing how transmitted radio-frequency signal power can be controlled as a function of time in response to network control commands and locally established power limits based on data such as proximity sensor data in accordance with an embodiment of the present invention.

This is illustrated in the example of FIG. 6. In the graph of FIG. 6, transmitted radio-frequency power P from a given device 10 is plotted vertically and time is plotted horizontally. In the FIG. 6 example, device 10 is initially transmitting radio-frequency signals at a power of P4. This power may satisfy regulatory limits on transmitted power provided that device 10 is not in the vicinity of the user's head. At time t1, the user of device 10 places device 10 in the vicinity of the user's head. The proximity between device 10 and the user's head may be detected using one or more sensors such as proximity sensor 25. When the proximity of device 10 to the user's head is detected, the device 10 lowers the maximum permitted transmit power to P3 (step 102 of FIG. 5). Even though a higher transmit power might be desired between times t1 and t2 by the cellular network, the maximum allowable transmit power of P3 is dictated by the close distance between device 10 and the user's head (e.g., a distance of less than a few centimeters). At time t2, device 10 is removed from the vicinity of the user's head. Sensors such as proximity sensor 25 detect this change in position, which allows the proximity-based maximum transmit power limitation to be removed (step 104 of FIG. 5). Between times t2 and t3, the transmitted power from device 10 is therefore maintained at power P4. At time t3, the device 10 is once more placed in proximity to the user's head, so the maximum allowable transmit power is reduced to P3. At time t4, device 10 reduces its output power to P2 in response to an internally detected condition, in response to sensor data, or in response to a transmit power adjustment command from a cellular base station. Because power P2 is lower than the maximum allowable power P3, device 10 can make this adjustment unhindered by the proximity limits imposed by the location of device 10.

Figure 7:
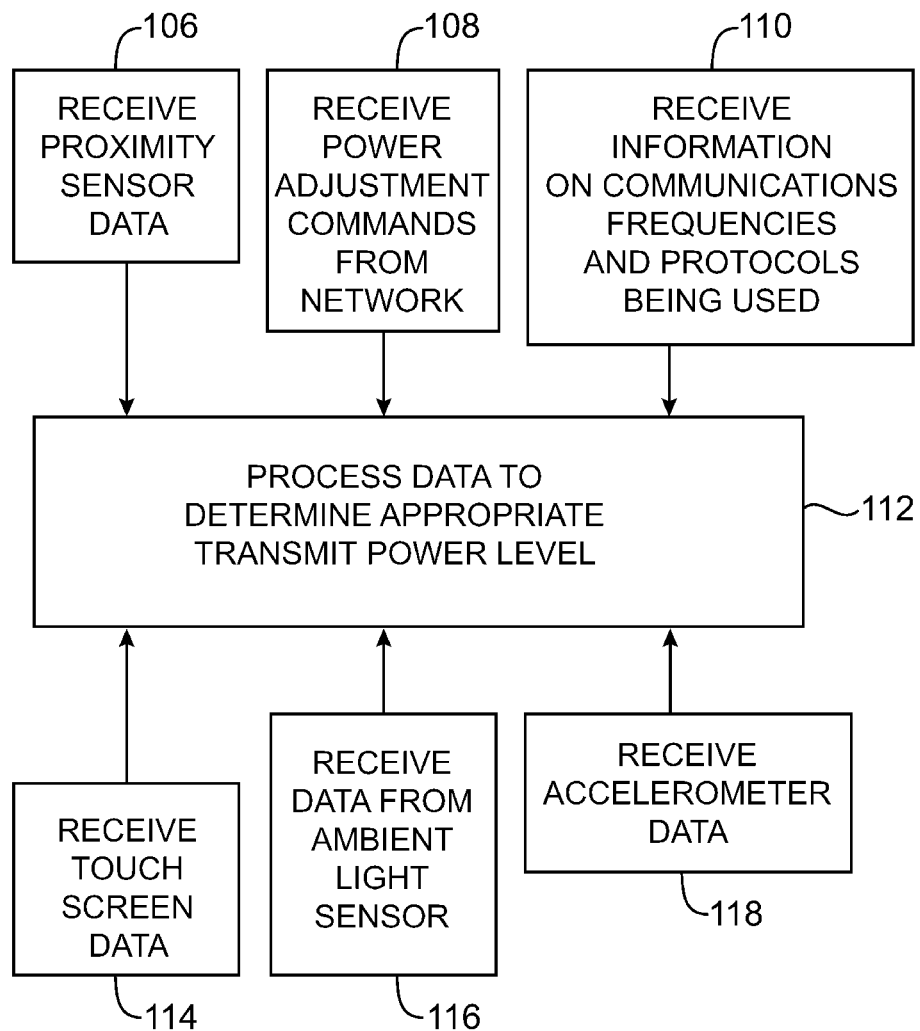
FIG. 7 is a flow chart of illustrative steps involved in gathering and analyzing data in a wireless electronic device to determine appropriate radio-frequency signal power settings for transmitted signals in accordance with an embodiment of the present invention.

In making adjustments such as these, device 10 can process inputs from a variety of sensors and sources. This is illustrated in the diagram of FIG. 7. As shown in FIG. 7, device 10 may process data from multiple sources in real time to determine an appropriate transmit power level to use in transmitting radio-frequency signals (step 112). During step 112, power output may be regulated using an arrangement of the type shown in FIG. 4 (as an example).

Data that may be used in making power level determinations includes proximity sensor data. Proximity sensor data may be received by control circuitry 72 from proximity sensor 25. As described in connection with touch screen capacitance 66 of FIG. 3, touch sensor data from a capacitive touch screen or other touch screen, from a touch pad, or from any other touch sensor may be processed by control circuitry 72 to help determine whether device 10 is in proximity to object 60 (step 114). Ambient light sensor data may also be used in determining whether device 10 is in proximity to object 60. For example, if an ambient light sensor signal drops at the same time that the proximity sensor data indicates the presence of a nearby object, it may be concluded with greater certainty that device 10 is in proximity to object 60. Ambient light sensor data may be received from a sensor such as sensor 27 (FIG. 1) at step 116.

Accelerometer data may be received by control circuitry 72 at step 118. Data from an accelerometer may be used to determine whether or not device 10 is in motion (and therefore likely being held by a user) or is at rest (and therefore likely not being held by a user. Accelerometer data may also be used to determine when device 10 is being held on its side or is being maintained in a horizontal orientation. This data may be combined with data from a proximity sensor and other data to help determine whether or not to reduce transmit power levels.

Transmit power adjustment commands may be received from external equipment such as a cellular base station at step 108. Internally generated information such as information on the current communications bands and protocols that are being used by device 10 may be gathered at step 110.

During step 112, control circuitry 72 may process data gathered during any suitable combination of steps 106, 108, 110, 114, 116, and 118 to determine an appropriate transmit power level at which to transmit radio-frequency signals from device 10.

It may be desirable to make transmit power adjustments in more than one band. For example, during the operations of steps 110 and 112 of FIG. 7, it may be desirable to maintain the total transmitted power below a particular level while transmission are being made in two or more different communications bands. In this type of situation, increases in transmit power in a first band may be offset by automatically reducing the transmit power in a second band.

Adjustments of this type may be made to maintain the total power level constant. For example, power reductions in one band may be made that exactly offset power increases that arise in another band. If desired, power adjustments may be made unequally, by imposing weighting factors on each of the bands. In this type of scenario, an increase in transmit power in one band may be adequately compensated by a lesser decrease in transmit power in another band when permitted by applicable regulations. Power adjustments may be made in any suitable number of bands (e.g., in one band, in two bands, in three bands, or in more than three bands). Moreover, transmit power levels in any suitable number of bands may be taken into consideration when computing desired transmit powers (e.g., one, two, three, more than three, etc.).

Figure 8:
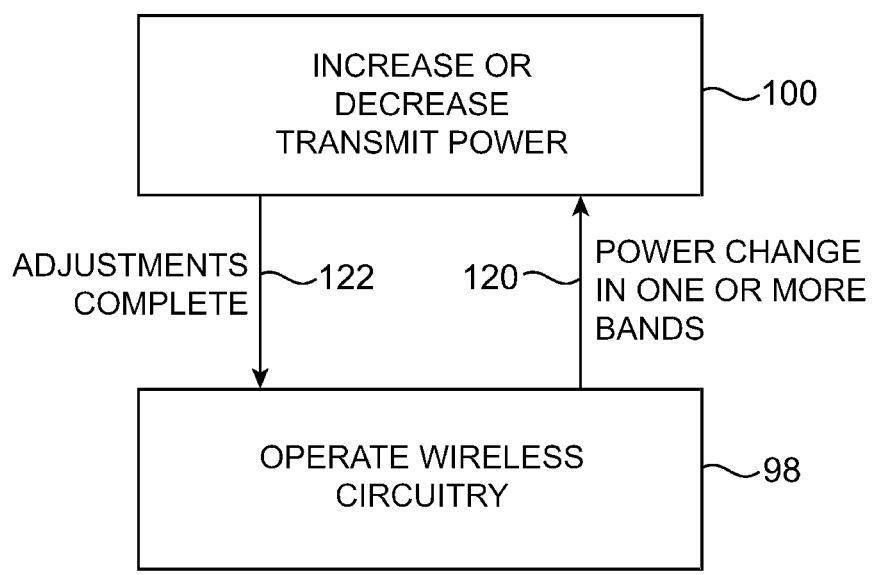
FIG. 8 is a flow chart of illustrative steps involved in gathering and analyzing data in a wireless electronic device to determine appropriate radio-frequency signal power settings for transmitted signals in scenarios in which one or more communications bands are being used in accordance with an embodiment of the present invention.

FIG. 8 shows illustrative steps that may be involved in operating a wireless electronic device to determine appropriate radio-frequency signal power settings for transmitted signals in situations in which one or more communications bands are being used. During step 98, device 10 may be operated in a system. Due to automatic activity, response to external input, or response to a user command, the transmit power associated with one or more communications bands may change, as indicated by line 120. As step 100, device 10 can make suitable transmit power adjustments in one or more communications bands to accommodate the changes of line 120. Device 10 may then return to normal operation at step 98, as indicated by line 122.

During step 100, adjustments may be made based on transmit power changes made in one or more communications bands. For example, an scheduled operation in device 10 may require that a particular communications band be activated or that the transmit power associated with that band otherwise be increased (e.g., to accommodate a system power level adjustment request, etc.). A band may also be activated or deactivated or may be subject to other transmit power adjustments based on manual input.

As an example, a user may desire to use a local area network (IEEE 802.11) wireless communications band (e.g., at 2.4 GHz) to download a file from a local area network. At the same time, device 10 may be handling a voice call over a cellular telephone network in a GSM 2G or 3 G communications band (as an example). Because the wireless transmissions at 2.4 GHz that have been initiated by the user in this type of situation may contribute to the total amount of radio-frequency power emission from device 10, it may be desirable to temporarily reduce the transmit power in the cellular telephone band to accommodate the user's use of the 2.4 GHz band. Once use of the 2.4 GHz band is complete (e.g., because the file download is complete or because the user has deactivated the 2.4 GHz band), the transmit power level in the cellular telephone band can be increased.

As another example, device 10 may automatically activate one or more GSM bands or other suitable long-range communications bands while another band or bands (e.g., telephone or local data) are already active. In this scenario, adjustments may be made to ensure that the total power in some or all communications bands remains below a desired level. If desired, weighting factors may be assigned to each band to reflect potentially different levels of importance when considering the transmit power in those bands. These weights may be assigned based on the amount by which each band's transmitted signals are believed to be absorbed by the user's body, based on the location of the antenna structures in device 10 that handle each band's signals (e.g., whether radiating towards the user's body or away from the user's body), based on regulatory limits for each band, based on other suitable factors, or based on combinations of these factors.

Moreover, other data may be taken into consideration when adjusting transmit powers. For example, device 10 may use global position system (GPS) data, user-supplied location data, or other suitable data to determine the current location of device 10. The location of device 10 may then be used to determine which of multiple possible geographically-based regulatory regimes should be applied to the operation of device 10. If, for example, it is determined that device 10 is present in a country in which the level of allowable transmit power is relatively large, device 10 may make adjustments during step 100 that allow for correspondingly larger amounts of transmitted radio-frequency power to be used by device 10. Proximity-based transmit power adjustments and adjustments based on other factors may made in real time to accommodate these currently applicable geographic regulatory restrictions.

The foregoing is merely illustrative of the principles of this invention and various modifications can be made by those skilled in the art without departing from the scope and spirit of the invention.

What is claimed is:

1. An electronic device, comprising:
   a capacitive proximity sensor that detects when objects are present within a given distance of the electronic device;
   a radio-frequency antenna with which radio-frequency signals are transmitted with a transmit power; and
   circuitry that adjusts the transmit power based at least partly on data from the capacitive proximity sensor, wherein the circuitry comprise transmitter circuitry that handles radio-frequency wireless transmissions in at least a first wireless communications band and a second wireless communications band and wherein the circuitry is configured to make radio-frequency wireless transmit power adjustments in the first wireless communications band at least partly based on changes that occur in radio-frequency wireless transmit power levels in the second wireless communications band.

2. A handheld electronic device operated by a user, comprising:
   an antenna with which radio-frequency signals are transmitted at a given transmit power;
   a first sensor that generates sensor data, wherein the first sensor comprises an accelerometer;
   a second sensor, wherein the second sensor generates proximity data indicative of whether at least part of the user is present within a given distance from the handheld electronic device; and
   control circuitry that controls the transmit power based at least partly on the sensor data and the proximity data, wherein the control circuitry establishes a transmit power ceiling for the radio-frequency signals based on the proximity data, wherein the control circuitry is configured to inhibit adjustments to the transmit power based on the sensor data in response to determining that the user is present within the given distance.

3. The handheld electronic device defined in claim 2 further comprising:
   a proximity sensor having a light source and a photodetector, wherein the control circuitry controls the transmit power by processing the sensor data, the proximity data, and information from the proximity sensor in parallel.

4. A method of operating a handheld electronic device, the method comprising:
   with an antenna, transmitting radio-frequency signals at a transmit power;
   with a capacitive proximity sensor, determining whether a user is within a given distance from the handheld electronic device;
   with control circuitry, adjusting the transmit power in response to determining that the user is within the given distance from the handheld electronic device;
   with the control circuitry, establishing a transmit power ceiling in response to determining that the user is within the given distance from the handheld electronic device;
   with an additional sensor, producing sensor data;
   with the control circuitry, adjusting the transmit power based on the sensor data from the additional sensor, wherein the adjustments to the transmit power based on the sensor data from the additional sensor includes adjustments requiring an increased transmit power that exceeds the transmit power ceiling; and
   with the control circuitry, preventing the adjustments to the transmit power based on the sensor data from the additional sensor that require the increased transmit power that exceeds the transmit power ceiling.

5. The method defined in claim 4 wherein the additional sensor comprises an accelerometer and wherein producing the sensor data comprises:
   with the accelerometer, producing accelerometer data.

6. The method defined in claim 4 further comprising:
   with the control circuitry, determining whether the electronic device is operating in a first communications mode or a second communications mode;
   with the control circuitry, allowing adjustments to the transmit power to exceed the transmit power ceiling in response to determining that the electronic device is operating in the first communications mode; and
   with the control circuitry, ensuring that the transmit power is maintained below the transmit power ceiling in response to determining that the electronic device is operating in the second communications mode.

7. The method defined in claim 6 wherein the first communications mode comprises a 2G cellular communications mode and wherein the second communications mode comprises a 3G cellular communications mode.

8. The method defined in claim 6 further comprising:
   wherein the electronic device wirelessly communicates using time division multiplexing in the first communications mode and wherein the electronic device does not wirelessly communicate using time division multiplexing in the second communications mode.

\* \* \* \* \*